US 6,862,372 B2

United States Patent
Yang et al.

(10) Patent No.: US 6,862,372 B2
(45) Date of Patent: Mar. 1, 2005

(54) SYSTEM FOR AND METHOD OF SHARPNESS ENHANCEMENT USING CODING INFORMATION AND LOCAL SPATIAL FEATURES

(75) Inventors: Yibin Yang, Pine Brook, NJ (US); Lilla Boroczky, Mount Kisco, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 622 days.

(21) Appl. No.: 10/029,828

(22) Filed: Dec. 27, 2001

(65) Prior Publication Data

US 2003/0123747 A1 Jul. 3, 2003

(51) Int. Cl.$^7$ ............................................. G06K 9/40
(52) U.S. Cl. .................. 382/254; 382/252; 382/260; 382/263; 382/275; 358/1.2; 358/3.26; 358/3.27
(58) Field of Search .............................. 382/244, 248, 382/252, 260, 263, 274, 275; 358/1.2, 3.26, 3.27, 463

(56) References Cited

U.S. PATENT DOCUMENTS

| | | | |
|---|---|---|---|
| 5,754,533 A | * 5/1998 | Bender et al. | 370/252 |
| 5,758,091 A | * 5/1998 | Hannah | 709/247 |
| 5,835,375 A | 11/1998 | Kitamura | |
| 5,912,815 A | * 6/1999 | Kim et al. | 700/33 |
| 6,023,295 A | 2/2000 | Pau | |
| 6,034,742 A | 3/2000 | Kimoto et al. | |
| 6,078,686 A | 6/2000 | Kim | |
| 6,111,596 A | * 8/2000 | Haskell et al. | 348/42 |
| 6,239,561 B1 | 5/2001 | Allender | |
| 6,278,736 B1 | 8/2001 | De Hann et al. | |
| 6,408,104 B1 | * 6/2002 | Lim et al. | 382/275 |

OTHER PUBLICATIONS

Boroczky et al, "Sharpness Enhancement for MPEG–2 Encoded/Transcoded video sources", IEEE, vol. 2, Oct. 7, 2001, pp. 407–410.

C–J Tsai, P. Karunaratne, N.P. Galatsanos and A.K. Katsaggelos, "A Compressed Video Enhancement Algorithm", Proc. of IEEE, ICIP'99, Kobe, Japan, Oct. 25–28, 1999.

B. Martins and S. Forchamer, "Improved Decoding of MPEG–2 Coded Video", Proc. of IBC'2000, Amsterdam, The Netherlands, Sep. 7–12, 2000, pp. 109–115.

* cited by examiner

*Primary Examiner*—Bhavesh M. Mehta
*Assistant Examiner*—Yosef Kassa
(74) *Attorney, Agent, or Firm*—Edward W. Goodman

(57) ABSTRACT

In accordance with the present invention a method of and a system for enhancing image quality of a coded digital video signal representative of at least one frame in a digital video system are provided. The method comprises the steps of creating a usefulness metric identifying a limit to sharpness enhancement to be applied to the coded digital video signal, defining local spatial features in the frame, and identifying a frame type for the frame. The usefulness metric created in the creating step is:

$$UME = 1 - M * \left(1 + \frac{q\_scale}{N}\right)^2 * \frac{\frac{q\_scale}{num\_bits}}{\max\left(\frac{q\_scale}{num\_bits}\right)}$$

wherein UME is the usefulness metric, q_scale is a quantization scale for a macroblock, num_bits is a number of bits to encode a luminance block, max is a function representing a maximum value for the frame, and M and N are scaling factors. The method further includes the steps of calculating a coding gain of each pixel in the frame based on the local spatial features and the usefulness metric in accordance with the frame type. Finally, the method also includes the steps of applying the coding gain to at least one sharpness enhancement algorithm, and generating an enhanced digital video signal by application of the sharpness enhancement algorithm.

19 Claims, 5 Drawing Sheets

SYSTEM FOR AND METHOD OF SHARPNESS ENHANCEMENT USING CODING INFORMATION AND LOCAL SPATIAL FEATURES

BACKGROUND OF THE INVENTION

1. Field of the Invention

The present invention is directed to a system and method for enhancing the quality of a digital video signal using coding information and local spatial features. The system and method of the invention enhances the sharpness of encoded or transcoded digital video without enhancing encoding artifacts.

2. Description of the Related Art

The development of high-quality multi-media devices, such as set-top boxes, high-end TV's, Digital TV's, Personal TV's, storage products, PDA's, wireless internet devices, etc., is leading to a variety of architectures and to more openness towards new features for these devices. Moreover, the development of these new products and their ability to display video data in any format, has resulted in new requirements and opportunities with respect to video processing and video enhancement algorithms.

MPEG (Moving Picture Expert Group) video compression is used in many current and emerging products. MPEG is at the heart of digital television set-top boxes, DSS, HDTV decoders, DVD players, video conferencing, Internet video, and other applications. These applications benefit from video compression by requiring less storage space for archived video information, less bandwidth for the transmission of the video information from one point to another, or a combination of both. Most of these devices receive and/or store video in the MPEG-2 format. In the future, they may receive and/or store video in the MPEG-4 format. The picture quality of these MPEG sources can vary greatly.

Research into human visual system has shown that the eye is more sensitive to changes in luminance, and less sensitive to variations in chrominance. MPEG operates on a color space that effectively takes advantage of the eye's different sensitivity to luminance and chrominance information. Thus, MPEG uses a YCbCr color space to represent the data values instead of RGB; where Y is the luminance component, experimentally determined to be Y=0.299R+0.587G+0.114B, Cb is the blue color difference component, where Cb=B−Y, and Cr is the red color difference component, where Cr=R−Y.

MPEG video is arranged into a hierarchy of layers to help with error handling, random search and editing, and synchronization, for example with an audio bit-stream. The first layer, or top layer, is known as the video sequence layer, and is any self-contained bitstream, for example a coded movie, advertisement or a cartoon.

The second layer, below the first layer, is the group of pictures (GOP), which is composed of one or more groups of intra (I) frames and/or non-intra (P or B) pictures. I frames are strictly intra compressed, providing random access points to the video. P frames are motion-compensated forward-predictive-coded frames, which are inter-frame compressed, and typically provide more compression than I frames. B frames are motion-compensated bidirectionally-predictive-coded frames, which are inter-frame compressed, and typically provide the most compression.

The third layer, below the second layer, is the picture layer itself. The fourth layer beneath the third layer is called the slice layer. Each slice is a contiguous sequence of raster ordered macroblocks, most often on a row basis in typical video applications. The slice structure is intended to allow decoding in the presence of errors. Each slice consists of macroblocks, which are 16×16 arrays of luminance pixels, or picture data elements, with two 8×8 arrays (depending on format) of associated chrominance pixels. The macroblocks can be further divided into distinct 8×8 blocks, for further processing such as transform coding. A macroblock can be represented in several different manners when referring to the YCbCr color space. The three formats commonly used are known as 4:4:4, 4:2:2 and 4:2:0 video. 4:2:2 contains half as much chrominance information as 4:4:4, which is a full bandwidth YCbCr video, and 4:2:0 contains one quarter of the chrominance information. Because of the efficient manner of luminance and chrominance representation, the 4:2:0 representation allows immediate data reduction from 12 blocks/macroblock to 6 blocks/macroblock.

I frames provide only moderate compression as compared to the P and B frames, where MPEG derives its maximum compression efficiency. The efficiency is achieved through a technique called motion compensation based prediction, which exploits temporal redundancy. Since frames are closely related, it is assumed that a current picture can be modeled as a translation of the picture at the previous time. It is possible then to accurately predict the data of one frame based on the data of a previous frame. In P frames, each 16×16 sized macroblock is predicted from the macroblocks of previously encoded I or P picture. Since frames are snapshots in time of a moving object, the macroblocks in the two frames may not correspond to the same spatial location. The encoder would search the previous frame (for P-frames, or the frames before and after for B-frames) in half pixel increments for other macroblock locations that are a close match to the information that is contained in the current macroblock. The displacements in the horizontal and vertical directions of the best match macroblocks from a cosited macroblock are called motion vectors. The difference between the current block and the matching block and the motion vector are encoded. The motion vectors can also be used for motion prediction in case of corrupted data, and sophisticated decoder algorithms can use these vectors for error concealment. For B frames, motion compensation based prediction and interpolation is performed using reference frames present on either side of each frame.

Next generation storage devices, such as the blue-laser-based Digital Video Recorder (DVR) will have to some extent HD (High Definition) (ATSC) capability and are an example of the type of device for which a new method of picture enhancement would be advantageous. An HD program is typically broadcast at 20 Mb/s and encoded according to the MPEG-2 video standard. Taking into account the approximately 25 Gb storage capacity of the DVR, this represents about a two-hour recording time of HD video per disc. To increase the record time, several long-play modes can be defined, such as Long-Play (LP) and Extended-Long-Play (ELP) modes.

For LP-mode the average storage bitrate is assumed to be approximately 10 Mb/s, which allows double record time for HD. As a consequence, transcoding is an integral part of the video processing chain, which reduces the broadcast bitrate of 20 Mb/s to the storage bitrate of 10 Mb/s. During the MPEG-2 transcoding, the picture quality (e.g., sharpness) of the video, is most likely reduced. However, especially for the LP mode, the picture quality should not be compromised too much. Therefore, for the LP mode, post-processing plays an important role in improving the perceived picture quality.

To date, most of the state-of-the-art sharpness enhancement algorithms were developed and optimized for analog video transmission standards like NTSC (National Television System Committee), PAL (Phase Alternation Line) and SECAM (SEquential Couleur A Memoire). Traditionally, image enhancement algorithms either reduce certain unwanted aspects in a picture (e.g., noise reduction) or improve certain desired characteristics of an image (e.g., sharpness enhancement). For these emerging storage devices, the traditional sharpness enhancement algorithms may perform sub-optimally on MPEG encoded or transcoded video due to the different characteristics of these sources. In the closed video processing chain of the storage system, information which allows for determining the quality of the encoded source can be derived from the MPEG stream. This information can potentially be used to increase the performance of video enhancement algorithms.

Because picture quality will remain a distinguishing factor for high-end video products, new approaches for performing video enhancement, specifically adapted for use with these sources, will be beneficial. In C-J Tsai, P. Karunaratne, N. P. Galatsanos and A. K. Katsaggelos, "A Compressed Video Enhancement Algorithm", *Proc. of IEEE, ICIP'99*, Kobe, Japan, Oct. 25–28, 1999, the authors propose an iterative algorithm for enhancing video sequences that are encoded at low bit rates. For MPEG sources, the degradation of the picture quality originates mostly from the quantization function. Thus, the iterative gradient-projection algorithm employed by the authors uses coding information such as quantization step size, macroblock types and forward motion vectors in its cost function. The algorithm shows promising results for low bit rate video, however, the method is marked by high computational complexity.

In B. Martins and S. Forchammer, "Improved Decoding of MPEG-2 Coded Video", *Proc. of IBC'2000*, Amsterdam, The Netherlands, Sep. 7–12, 2000, pp. 109–115, the authors describe a new concept for improving the decoding of MPEG-2 coded video. Specifically, a unified approach for deinterlacing and format conversion, integrated in the decoding process, is proposed. The technique results in considerably higher picture quality than that obtained by ordinary decoding. However, to date, its computational complexity prevents its implementation in consumer applications.

Both papers describe video enhancement algorithms using MPEG coding information and a cost function. However, both of these scenarios, in addition to being impractical, combine the enhancement and the cost function. A cost function determines how much, and at which locations in a picture, enhancement can be applied. The problem which results from this combination of cost and enhancement functions is that only one algorithm can be used with the cost function.

Moreover, previous attempts to improve the sharpness enhancement algorithms, utilized only the coding information from the MPEG bitstream. The previous sharpness enhancement algorithms did not differentiate between different picture types, such as I, P and B frames. Consequently, the optimal sharpness enhancement result was not achieved, as picture parts with coding artifacts and the artifact-free parts were not differentiated. The result may be a sub-optimal sharpness enhancement.

SUMMARY OF THE INVENTION

The purpose and advantages of the present invention will be set forth in and apparent from the description that follows, as well as will be learned by practice of the invention. Additional advantages of the invention will be realized and attained by the methods and systems particularly pointed out in the written description and claims hereof, as well as from the appended drawings.

It is therefore an object of the present invention to provide a system for and method of enhancing picture quality of a coded digital video signal by utilizing a sharpness enhancement algorithm for a wide range of digital compressed video sources, from a low bit rate to a high bit rate.

It is a further object of the present invention to provide a system for and a method of enhancing image quality of a coded digital video signal by utilizing a sharpness enhancement algorithm which differentiates between different picture types, thus achieving a more optimal sharpness enhancement result.

It is another object of the present invention to provide a system for and a method of enhancing image quality of a coded digital video signal by utilizing a sharpness enhancement algorithm which achieves higher temporal consistency.

It is yet another object of the present invention to provide a system for and a method of enhancing image quality of a coded digital video signal by utilizing a sharpness enhancement algorithm which uses coding information from an encoded bitstream in combination with local spatial features to define a quantitative index, such as gain, which determines which pixel is a good candidate to enhance and how much to enhance the particular pixel.

To achieve these and other advantages and in accordance with the purpose of the invention, as embodied and broadly described, the invention includes a method of enhancing image quality of a coded digital video signal representative of at least one frame in a digital video system. The method comprises the steps of: creating a usefulness metric identifying a limit to sharpness enhancement to be applied to the coded digital video signal, defining local spatial features in a frame and identifying a frame type for the frame. The method further includes the steps of calculating a coding gain of each pixel in the frame based on the local spatial features and the usefulness metric in accordance with the frame type and applying the coding gain to at least one sharpness enhancement algorithm. Finally the method includes generating an enhanced digital video signal by application of the sharpness enhancement algorithm.

The invention also includes a system for enhancing sharpness of a coded digital video signal representative of at least one frame. The system comprises: a selector to select and extract statistical information from a coded digital video signal, a usefulness metric generator to create a usefulness metric for the coded digital video signal after decoding. The usefulness metric identifies a limit to sharpness enhancement to be applied to a decoded video signal. The systems further includes means for defining local spatial features in the frame, means for identifying a frame type for the frame. In addition, the system includes means for calculating a coding gain of each pixel in the frame based on the local spatial features and the usefulness metric in accordance with the frame type, and a sharpness enhancer which applies a sharpness enhancement algorithm to the decoded digital video signal to improve sharpness of the signal based on the coding gain.

It is to be understood that both the foregoing general description and the following detailed description are exemplary and are intended to provide further explanation of the invention claimed.

The accompanying drawings, which are incorporated in and constitute part of this specification, are included to illustrate and provide a further understanding of the method and system of the invention. Together with the description, the drawings serve to explain the principles of the invention.

DETAILED DESCRIPTION OF THE PREFERRED EMBODIMENT

Reference will now be made in detail to the present preferred embodiments of the invention, an example of which is illustrated in the accompanying drawings. The method and corresponding steps of the invention will be described in conjunction with the detailed description of the system.

FIGS. 1 through 7, discussed below, and the various embodiments herein to describe the principles of the system and method of the present invention, are by way of illustration only and should not be construed in any way to limit the scope of the invention. The system and method of the present invention will be described as a system for and method of enhancing image quality of a coded digital video signal in a digital television set. It is important to realize that the system and method of the present invention is not limited to digital television sets. Those skilled in the art will readily understand that the principles of the present invention may also be successfully applied in any type of digital video system, including, without limitation, television receivers, set top boxes, storage devices, computer video display systems, and any type of electronic equipment that utilizes or processes digital video signals. The term "digital video system" is used to refer to these and other similar types of equipment available now or in the future. In the descriptions that follow, a digital television set is employed as one representative illustration of a digital video system.

Figure 1:
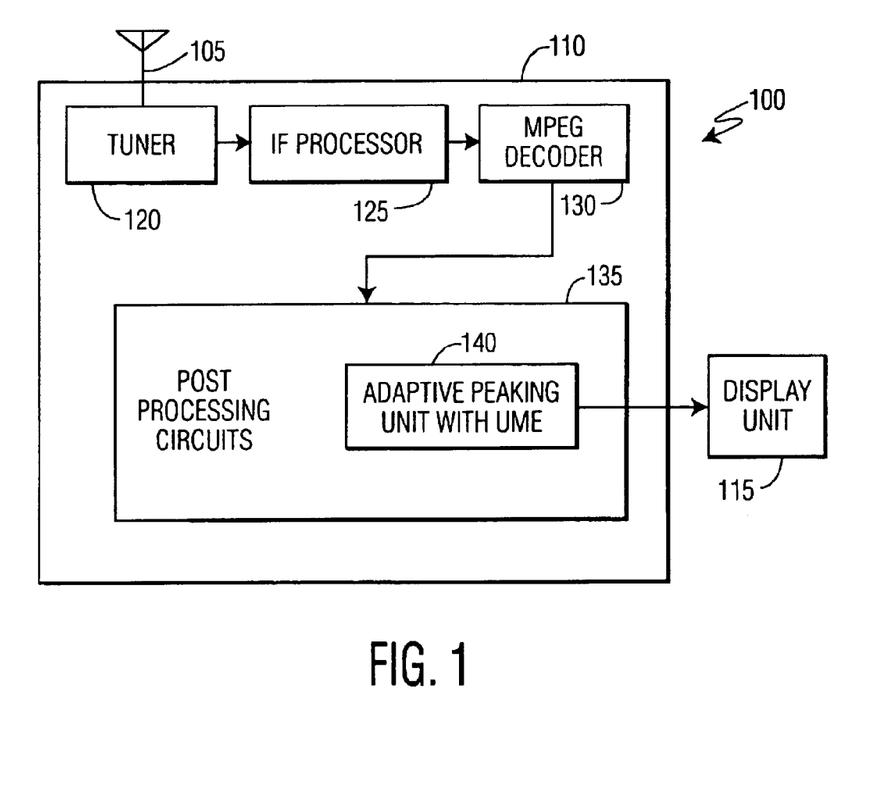
FIG. 1 is a block diagram of an exemplary digital television set comprising the system and method of the present invention.

FIG. 1 is a block diagram of a digital television set 100 that utilizes the apparatus and method of the present invention. Digital television set 100 comprises television receiver 110 and display unit 115. Display unit 115 may be a cathode ray tube or a flat panel display or any type of equipment for displaying video images. Television receiver 110 comprises antenna 105 for receiving television signals. Antenna 105 is coupled to tuner 120. Tuner 120 is coupled to intermediate frequency ("IF") processor 125. IF processor 125 as embodied herein, is coupled to a decoder 130. While the present invention depicts an MPEG decoder, the invention is not limited to MPEG type encoding/decoding applications. According to other embodiments of the present invention, any block based compression schemes, such as, for example, JPEG (still image compression standard), MPEG-1,2,4 (digital video standards), H.261, H.263 (video conferencing standards) and others can be utilized. In these standards, a two-dimensional (2D) DCT (Discrete Cosine Transform) is applied to 8 by 8 blocks of pixels in the image that is compressed. The 64 (8×8=64) coefficients produced by the DCT are then quantized to provide the actual compression. In typical images, most DCT coefficients from a DCT on an 8 by 8 block of pixels are small and become zero after quantization. This property of the DCT on real world images is important to the compression schemes.

In accordance with the present invention a method and corresponding system are provided for enhancing image quality of a coded digital video signal representative of at least one frame in a digital video system. The method generally includes, as described in detail below, the steps of creating a usefulness metric identifying a limit to sharpness enhancement to be applied to the coded digital video signal, defining local spatial features in the frame, and identifying the type of frame. A coding gain is then calculated for each pixel in the frame based on the local spatial features and the usefulness metric in accordance with the frame type. Once calculated, the coding gain is then applied to at least one sharpness enhancement algorithm to generate an enhanced digital video signal.

Figure 7:
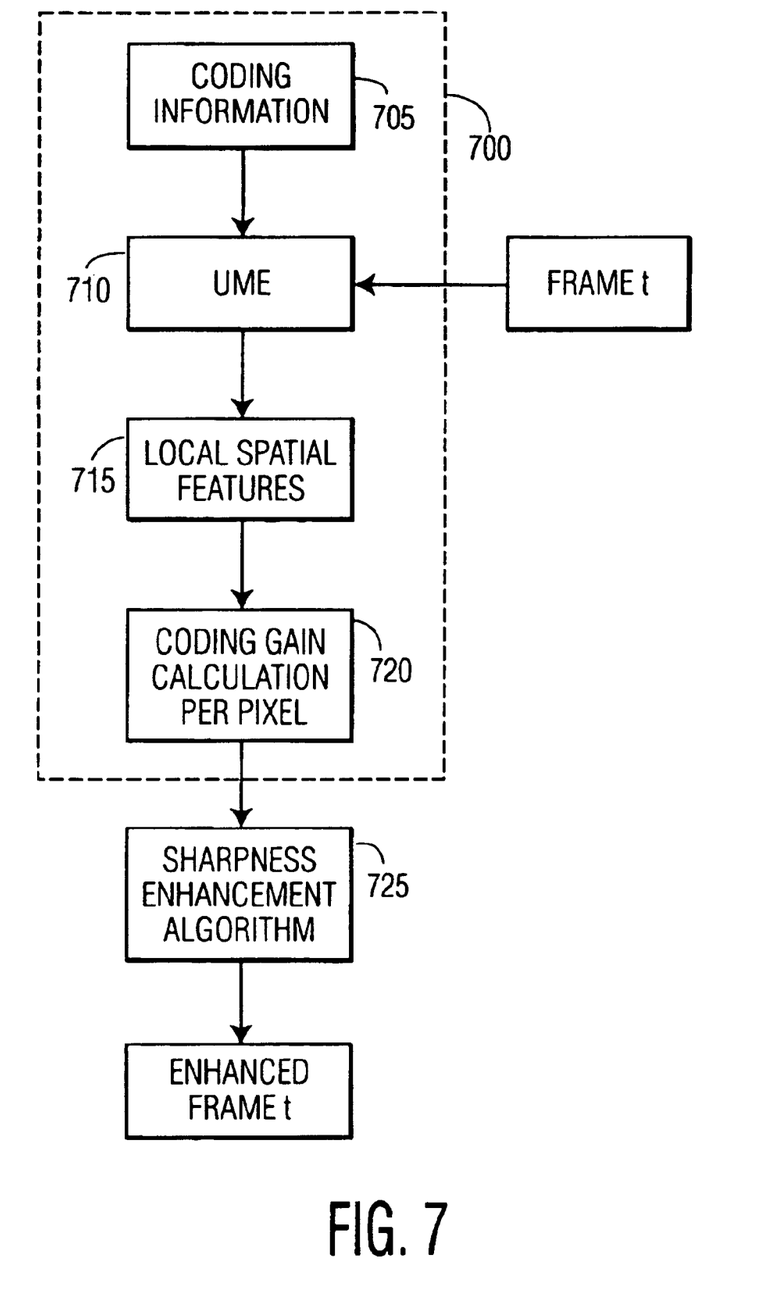
FIG. 7 is a flow diagram illustrating an advantageous embodiment of a method of operation of the present invention.

FIG. 7 is a flow diagram illustrating an advantageous embodiment of the method of the present invention. The steps of this method embodied herein will be described in greater detail below. The method for calculating the coding gain for processing one frame (frame "t") is generally indicated by the number 700. First, the coding information is obtained (step 705). Then the UME and the local spatial features for frame t are calculated in accordance with the invention (steps 710, 715).

The method further includes the steps of calculating a coding gain of each pixel in the frame based on the local spatial features and the usefulness metric in accordance with the frame type identified (step 720).

Finally, the method includes the step of applying the coding gain to at least one sharpness enhancement algorithm, and generating an enhanced digital video signal by application of the sharpness enhancement algorithm.

For purpose of clarity, the system and method will now be described in combination with reference to the drawings. The present invention creates the Usefulness Metric for Enhancement (UME) for enhancing video signal quality. The output of MPEG decoder 130 is coupled to post-processing circuits 135 for application of at least one sharpness enhancement algorithm. For example, and not limitation, post processing circuits 135 may comprise an adaptive peaking unit 140 comprising the usefulness metric (UME) of the present invention. Adaptive peaking unit 140 may be located at an appropriate location within the post-processing circuits 135. The output of post-processing circuits 135 is input to display unit 115.

As embodied herein, for purpose of illustration, adaptive peaking unit 140 processes the video signals received from MPEG decoder 130. Adaptive peaking unit 140 uses the UME in this example, to generate a value of a coding gain for use in the adaptive peaking process. The process of adaptive peaking is illustrative and shows how the UME of the present invention may be used. It is understood that the system and method of the present invention is not limited to the process of adaptive peaking. The UME may be used with more than one alternative type of video enhancement algorithm.

Adaptive peaking unit 140 processes the video signals in a manner that takes into account the coded information in the video signal as well as the local spatial features, such as the variance of pixel luminance values. The output of adaptive peaking unit 140 is an enhanced luminance signal for the video signals that adaptive peaking unit 140 receives from MPEG decoder 130. The luminance signal that is determined by adaptive peaking unit 140 provides a more accurate and visually distinct video image than that provided by prior art adaptive peaking units as will be described further below. Adaptive peaking unit 140 transfers the enhanced luminance signal to other circuits within post processing circuits 135. Post-processing circuits 135 are capable of utilizing the enhanced luminance signal to enhance the quality of video signals.

Post-processing circuits 135 are capable of carrying out several different types of video signal processing. For example, some of the video signal processing applications include (a) noise level adaptive noise reduction algorithms, (b) noise level adaptive sharpness enhancement, (c) noise level adaptive luminance-chrominance separation, (d) noise level adaptive motion detection, (e) noise level adaptive motion estimation and compensation, (f) noise level adaptive up-conversion, (g) noise level adaptive feature enhancement, and (h) noise level adaptive object based algorithms.

Figure 2:
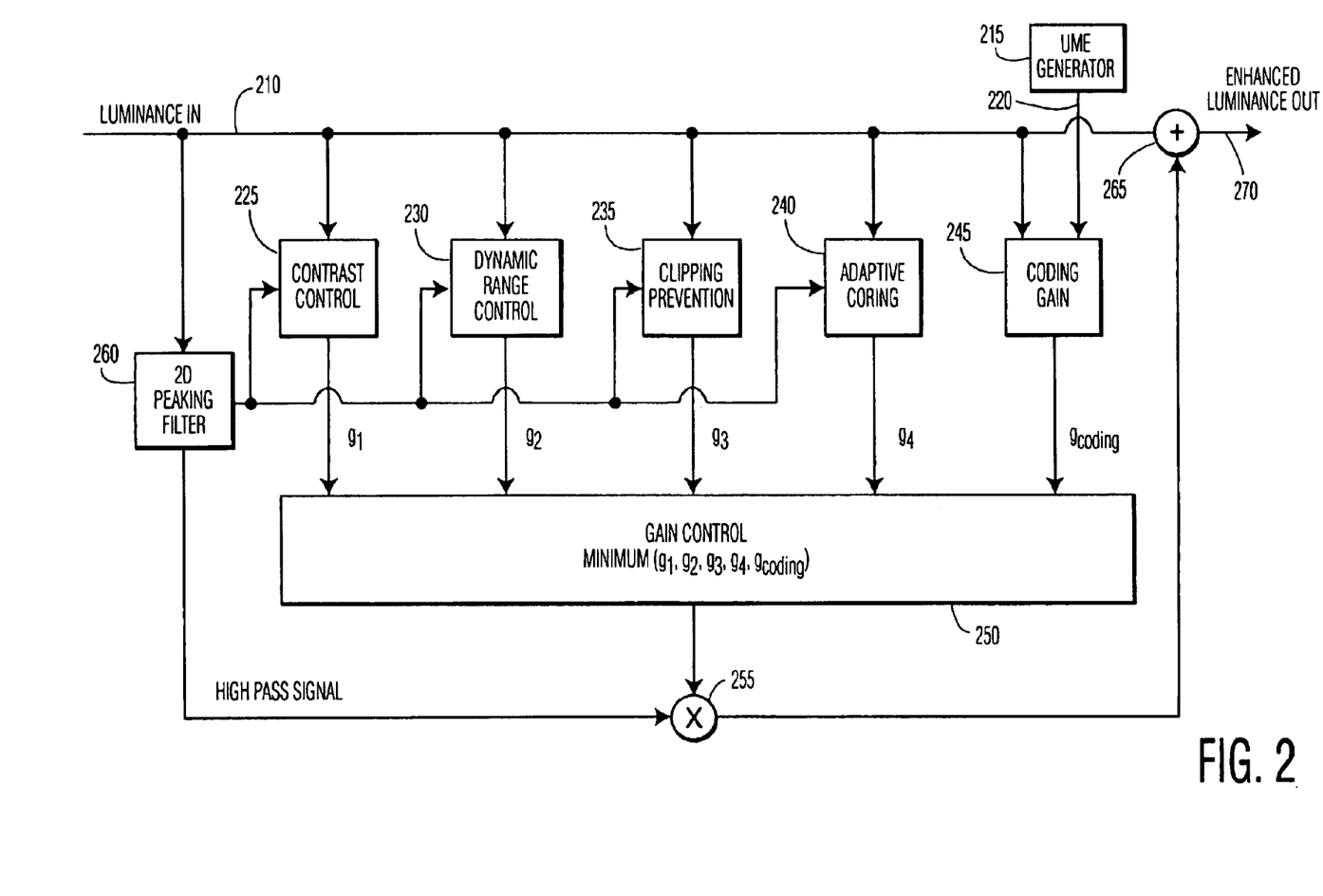
FIG. 2 is a block diagram illustrating an advantageous embodiment of an adaptive peaking unit comprising a usefulness metric generator and a coding gain control block of the present invention.

FIG. 2 is a block diagram illustrating the system and method of adaptive peaking unit 140 according to one advantageous embodiment of the present invention. FIG. 2 illustrates how the usefulness metric for enhancement (UME) of the present invention can be applied to an adaptive peaking algorithm for sharpness enhancement. The adaptive peaking algorithm which is well known in the art is directed at increasing the amplitude of the transient of an input luminance signal 210. The adaptive peaking algorithm conventionally does not always provide optimal video quality for an "a priori" encoded/transcoded video source. This is mainly a result of the fact that the characteristics of the MPEG source are not taken into account.

In the present invention, a usefulness metric generator 215 generates a usefulness metric (UME). The UME is designated with reference numeral 220. UME 220 takes into account the characteristics of the MPEG source, such as a quantization parameter and a number of bits spent to encode a macroblock. The original algorithm is extended by using UME 220, thereby significantly increasing the performance of the adaptive peaking algorithm.

The principles used by adaptive peaking algorithms are well known in the prior art. One example of an adaptive peaking algorithm utilizes four (4) pixel-based control blocks. As shown in FIG. 2, the four (4) control blocks are contrast control block 225, dynamic range control block 230, clipping prevention block 235, and adaptive coring block 240. Contrast control block 225 generates gain signal "$g_1$". Dynamic range control block 230 generates gain signal "$g_2$". Clipping prevention block 235 generates gain signal "$g_3$". Adaptive coring block 240 generates gain signal "$g_4$". These four (4) pixel based control blocks take into account particular local characteristics of the video signal such as contrast, dynamic range, and noise level. However, these four (4) control blocks do not take into account information concerning coding properties of the video signal and local spatial features, such as the variance of pixel luminance values.

The system of the present invention provides a coding gain block 245. Coding gain block 245 uses usefulness metric (UME) 220 as well as the local spatial features to determine an allowable amount of peaking, as discussed further below. Coding gain block 245 generates gain signal "$g_{coding}$". Dynamic gain control block 250 selects the minimum of the five (5) gain signals ($g1, g2, g3, g4, g_{coding}$) to generate a final gain signal "g". Multiplier circuit 255 multiplies the final gain signal "g" by the high pass signal that has been filtered by 2D peaking filter 260. Adder 265 adds the product from multiplier circuit 255 to the original luminance value of a pixel represented by luminance input signal 210. In this manner, the enhanced luminance output signal 270 is generated. Each of these functions can be performed by suitable components well known in the art.

Figure 3:
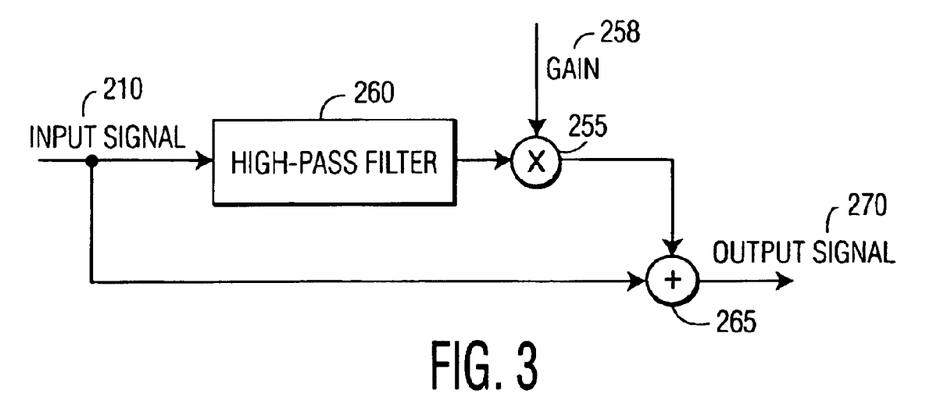
FIG. 3 is a block diagram illustrating an alternate embodiment of a sharpness enhancement algorithm used in accordance with the present invention.

For purposes of example and not limitation, FIG. 3 illustrates a typical system for enhancing sharpness of a coded digital video in accordance with the present invention. The system comprises a high-pass filter 260 for filtering the input video signal 210, a multiplier 255 for multiplying the high pass filtered signal by the coding gain 258 determined through any of the methods of the present invention. The multiplication generates a gain controlled signal. The system further includes an adder 265 for adding the input video signal 210 with the gain controlled signal and generating the enhanced luminance output signal 270 which has improved picture quality as compared to the input signal 210.

Figure 4:
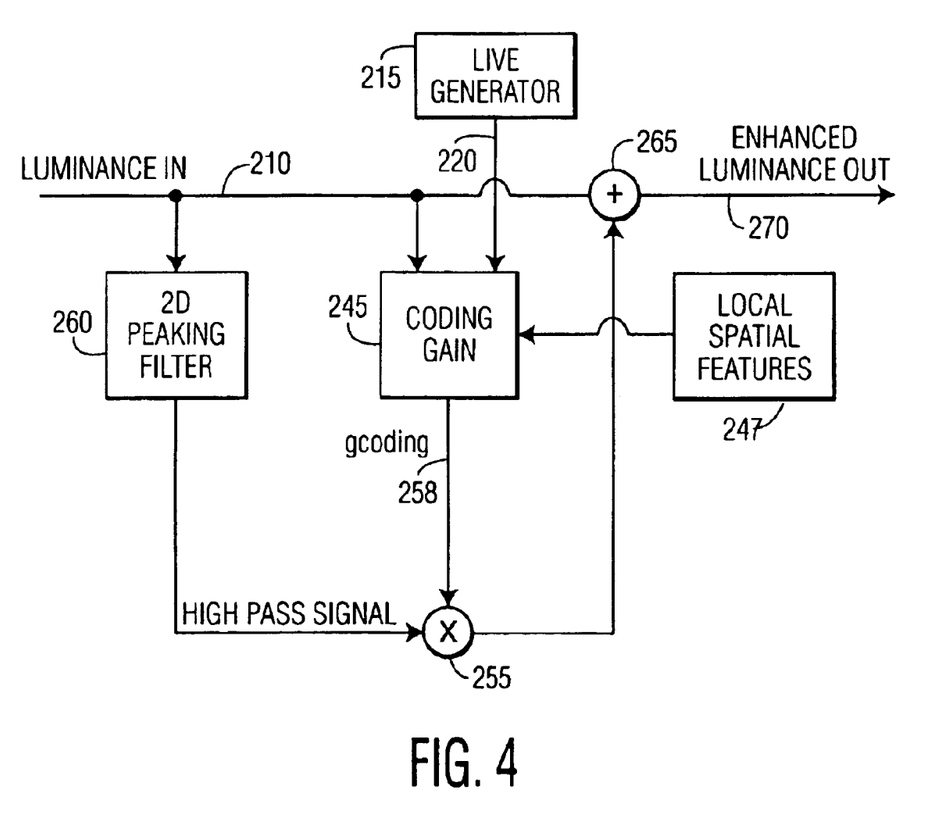
FIG. 4 is a block diagram illustrating an alternate advantageous embodiment of an adaptive peaking unit comprising a usefulness metric generator and a coding gain control block of the present invention.

In FIG. 4, UME 220 calculates (on a pixel by pixel basis or on a regional basis) how much a pixel or region can be enhanced without increasing coding artifacts. UME 220 is derived from the MPEG coding information present in the bitstream. The coding information present in the bitstream can be retrieved during the decoding procedure. UME 220 provides an indication of the spatio-temporal characteristics or picture quality of the video.

In accordance with the invention, the finest granularity of MPEG information directly obtained during decoding is either (1) based on macroblock (MB) quantities, or (2) based on block based quantities. However, for spatial (pixel) domain video enhancement, the UME should be calculated for each pixel of a picture in order to ensure the highest picture quality.

One parameter easily extracted from MPEG information is the quantization parameter (q_scale), as it is present in every coded macroblock (MB). The higher the quantization parameter, the coarser the quantization, and therefore, the higher the quantization error. A high quantization error results in coding artifacts. Consequently, enhancement of pixels in a macroblock (MB) with a high quantization parameter may be suppressed more.

Another useful item of information is the number of bits (num_bits) spent to code a macroblock (MB) or a block. Generally, the less bits spent for encoding a block, the lower the quality of the block. However, this quantity (num_bits) is also highly dependent on scene content, bitrate, frame type (such as I (intra), P (predicted), B (bidirectionally predicted) frame types), motion estimation, and motion compensation.

It is also possible to consider the distribution of existing DCT coefficients in a block. In addition, motion vectors can be used to obtain information on the temporal characteristics of the video to be enhanced. It is well known that the motion vectors estimated and used for MPEG encoding do not necessarily represent true motion in the video. However, the motion vectors can help to identify static areas and use the static areas to improve the temporal consistency of the enhancement from frame to frame even when the motion vectors are not reliable.

Both, the quantization parameter (q_scale) and the number of bits (num_bits) spent (to code a macroblock (MB) or a block) are widely used in rate control calculations of MPEG encoding.

Because a larger quantization parameter value usually results in increased coding artifacts, the UME should typically be inversely related to the quantization parameter, q_scale.

As previously noted, the method and system of the present invention create a usefulness metric identifying a limit to sharpness enhancement to be applied to the coded digital video signal. According to the preferred embodiment of the present invention, the following equation can be used to create the UME:

$$UME = 1 - M * \left(1 + \frac{q\_scale}{N}\right)^2 * \frac{\frac{q\_scale}{num\_bits}}{\max\left(\frac{q\_scale}{num\_bits}\right)}, \quad \text{Equation (1)}$$

wherein UME is the usefulness metric, q_scale is the quantization scale for a macroblock, num_bits is the number of bits to encode the luminance block (i.e. the number of bits to code AC coefficients of a DCT block of the luminance block), max is a function representing the maximum value for the whole frame, and M and N are experimentally determined scaling factors. The N factor is in the range of q_scale values. The M factor depends on the subjective perception of a user. For example, for a stronger sharpness enhancement the M factor is lowered, but if the user prefers a less sharper image, then the M factor can be increased. Possible M values are 1,2,4,8, etc.

In one advantageous embodiment of the invention, the value of UME can range from a value of "zero" ("0") to a value of "one" ("1"). A value of "zero" for UME means that no sharpness enhancement is allowed for a particular pixel, while a value of "one" means that the pixel can be freely enhanced without the risk of enhancing any coding artifacts.

In the preferred embodiment of the present invention the UME in Equation (1) is calculated for each block.

According to the preferred embodiment of the present invention, both the UME and the local spatial features are used to calculate an coding gain to be used in a sharpness enhancement algorithm. The present invention therefore includes defining local spatial features of each frame of the video signal.

As shown in FIG. 4, for the embodiment herein, the local spatial feature is defined by calculator 247. In the preferred embodiment of the present invention, the local spatial feature is defined as a variance of the luminance value for each pixel over n×n window, covering n×n pixels. The variance is defined as follows:

$$\text{var}(i, j) = \sum_{k=-q}^{q} \sum_{m=-q}^{q} |pix(i+k, j+m) - \text{mean}| \quad \text{Equation (2)}$$

wherein q=(n−1)/2, pix(i+k, j+m) is the pixel value at the location (i+k, j+m) and mean is the average pixel value over said n×n window. Terms i and j are the original coordinates of a pixel and k and m are the displacement values. Alternatively, the local spatial feature may be defined as region (texture or plain areas) map.

Because the UME is calculated to account for coding characteristics, the UME prevents the enhancement of coding artifacts such as blocking and ringing. Thus, the prevention or reduction of artifacts of non-coding origin, which might result from applying too much enhancement, is addressed by other parts of the sharpness enhancement algorithm.

In accordance with the present invention, the coding gain is calculated for each pixel in the frame based on the local spatial features and the UME and applied to at least one sharpness enhancement algorithm. For example, the UME can be combined with any peaking algorithm. Alternatively, the UME can be adapted to any spatial domain sharpness enhancement algorithm. It is also possible to utilize only coding information and the local spatial features in combination with an adaptive peaking algorithm.

FIG. 4 illustrates such an embodiment. In FIG. 4, the four (4) control blocks 225, 230, 235, and 240 of FIG. 2 have been eliminated. Only coding gain block 245 remains. The coding gain is calculated by utilizing the UME and the local spatial features by differentiating among different picture types. The local spatial features calculator 247 could be implemented in software or hardware or both. In the MPEG bitstream case, the different picture types are I, P and B.

The I (or intra coded) frames use DCT encoding only to compress a single frame without reference to any other frame in the sequence. P (or predicted) frames are coded as differences from the last I or P frame. The new P-frame is first predicted by taking the last I or P frame and predicting the values of each new pixel. As a result P-frames typically provide a compression ratio better than I-frames. B (or bi-directional) frames are coded as differences from the last or next I or P frame. B-frames use prediction similar to P-frames, but for each block either or both, the previous I or P frame is used or the next I or P frame is used. Both P and B frames use motion prediction and DCT encoding, however, B-frames typically have an improved compression compared with P-frames, because it is possible to choose for every macroblock whether the previous or next frame is taken for comparison.

As embodied herein and in accordance with a preferred aspect of the present invention, for purpose of illustration, the coding gain will be calculated differently depending on whether the frame is an I-frame, P-frame or B-frame.

Figure 5:
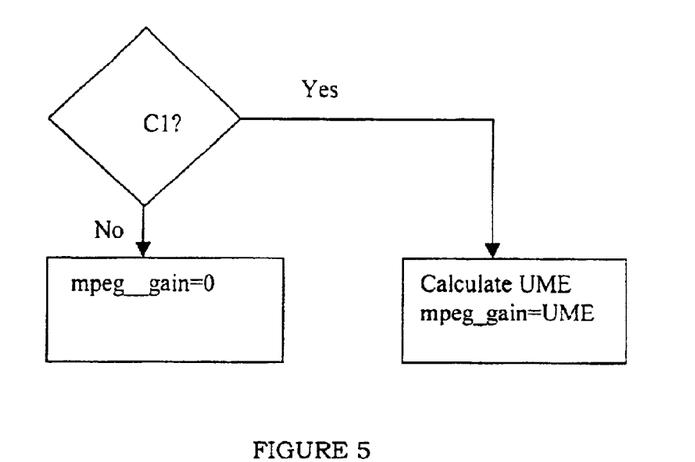
FIG. 5 is a flow diagram illustrating a method of computing a coding gain for an I-frame.

For example, for an I-frame, as illustrated in FIG. 5, if the condition C1 is satisfied the UME is calculated according to the Equation (1) and the coding gain is set to equal to the UME. The condition is defined as: ((var>VAR_THREAD) and (num_bits≠0)), wherein var is the local spatial feature, VAR_THREAD is a predetermined variance threshold, and num_bits is the number of bits used to encode a luminance block. Conversely, if the condition C1 is not satisfied, the coding gain is set to 0, and thus the input signal is unchanged.

In particular, if local spatial feature is greater than a predetermined variance threshold and if the number of bits to encode the luminance block is not zero, then UME is calculated in accordance with Equation (1), and the coding gain is equal to the UME. If the local spatial feature is not greater than a predetermined variance threshold or if the number of bits to encode the luminance block is zero, then the coding gain is equal to zero.

The MPEG-2 video compression standard allows the encoding of certain macroblocks (MB) and blocks in P (predicted) and B (bidirectionally predicted) pictures with no data. These macroblocks are called "skipped" macroblocks. Skipped macroblocks (MB) can be reconstructed in the decoding procedure using the reference pictures and coding information from the most recently coded and non-skipped macroblocks (MB). Furthermore, for macroblocks (MB) that are fully motion compensated, there are no DCT data in the bitstream or certain blocks in a macroblock (MB) are not coded.

Figure 6:
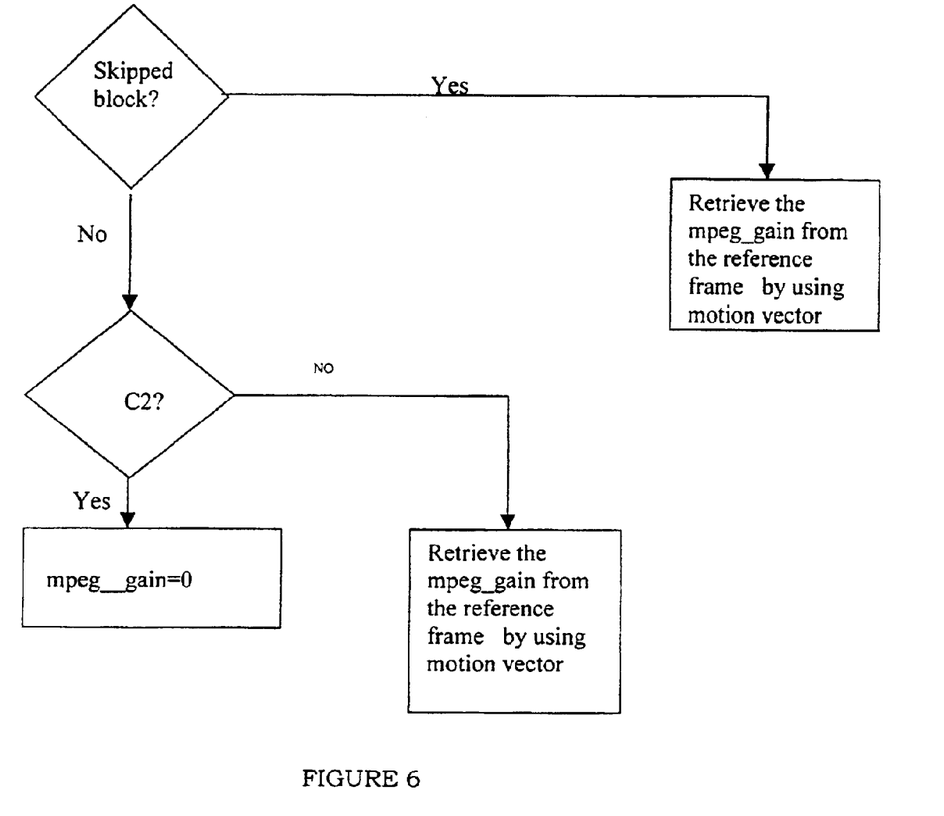
FIG. 6 is a flow diagram illustrating a method of computing a coding gain for a P-frame.

Therefore, for a P-frame the algorithm for computing the coding gain is depicted in FIG. 6. If a macroblock is skipped, (i.e. the four luminance blocks of the macroblock are skipped), the coding gain is retrieved from the reference frame based upon a motion vector as is known in the art. However, if the macroblock is not skipped, condition C2 has to be evaluated. Condition C2 is defined as (var<=VAR_THREAD). Therefore if the local spatial feature (var) is greater than the predetermined variance threshold (VAR_THREAD), the coding gain is retrieved from the reference frame by using a motion vector. Conversely, if the local spatial feature (var) is equal to or less than the predetermined variance threshold (VAR_THREAD), the coding gain is set to 0. For intra-encoded blocks, motion vectors are assigned (0,0).

For a B-frame, the coding gain map of the previous reference frame is assigned the coding gain. Alternatively, the same procedure used in P-frame can be applied to B-frame.

Further in accordance with the present invention, the coding gain is applied to at least one sharpness enhancement algorithm to generate an enhanced digital video signal. In FIG. 4, the coding gain computed above is multiplied by the output of the high-pass filter 260 by using the multiplier circuit 255. The result is then added by adder 265 to the original luminance input signal 210 to create an enhanced luminance output signal 270.

For example, and with reference to the drawings for purpose of illustration, the sharpness enhancement algorithm is applied with the coding gain as illustrated in FIG. 3. In the preferred embodiment of the present invention, the high-pass filter to be used may be:

$$k * \begin{bmatrix} 0 & -1 & 0 \\ -1 & 4 & -1 \\ 0 & -1 & 0 \end{bmatrix},$$

wherein k is a scaling factor in the range between 0 and 1, i.e. (0,1], thus excluding 0, but including 1. Factor k typically depends on the subjective perception of the user. For sharper images k is increased.

The result of the sharpness enhancement algorithm, as illustrated in FIG. 3 is the following:

$$\text{out\_pixel} = \text{input\_pixel} + \text{mpeg\_gain} * \text{convolution\_result} \quad \text{Equation (3)}$$

wherein output_pixel is the final luminance value to be used for the pixel, input_pixel is the luminance value of the input pixel, mpeg_gain is the coding gain, and convolution_result is the high-pass filter output. A signal representation of the result of the sharpness enhancement algorithm is then generated in a known manner for each pixel of the frame.

The invention can also be applied to high definition (HD) and standard definition (SD) sequences such as would be present in a video storage application having high definition (HD) capabilities and allowing long play (LP) mode. The majority of such video sequences are transcoded to a lower storage bitrate from broadcast MPEG-2 bitstreams. For the long play (LP) mode of this application, format change can also take place during transcoding. Standard definition (SD) or high definition (HD) video sequences are encoded, decoded, and then processed with the sharpness enhancement algorithm, according to the present invention, provide superior video quality for a priori encoded or transcoded video sequences as compared to algorithms that do not use coding information.

The method and system of the present invention, as described above and shown in the drawings, provide for an improved way to enhance the quality of a digital coded video signal, by utilizing a sharpness enhancement algorithm.

It will be apparent to those skilled in the art that various modifications and variations can be made in the method and system of the present invention without departing from the spirit or scope of the invention. Thus, it is intended that the present invention include modifications and variations that are within the scope of the appended claims and their equivalents.

What is claimed is:

1. A method of enhancing image quality of a coded digital video signal representative of at least one frame in a digital video system, said method comprising the steps of:

creating a usefulness metric identifying a limit to sharpness enhancement to be applied to said coded digital video signal;

defining local spatial features in a frame;

identifying a frame type for the frame;

calculating a coding gain of each pixel in the frame based on said local spatial features and said usefulness metric in accordance with the frame type;

applying said coding gain to at least one sharpness enhancement algorithm; and generating an enhanced digital video signal by application of said sharpness enhancement algorithm.

2. The method of claim 1, wherein the algorithm applied during the applying step is:

$$\text{out\_pixel} = \text{input\_pixel} + \text{mpeg\_gain} * \text{convolution\_result},$$

wherein output_pixel is a final luminance value to be used for the pixel, input_pixel is a luminance value of the input pixel, mpeg_gain is the coding gain, and convolution_result is a high-pass filter output.

3. The method of claim 2, wherein the high-pass filter output is obtained from a high-pass filter defined by $$k * \begin{bmatrix} 0 & -1 & 0 \\ -1 & 4 & -1 \\ 0 & -1 & 0 \end{bmatrix},$$

wherein k is a scaling factor in the range between 0 and 1.

4. The method of claim 1, wherein said usefulness metric created in the creating step is:

$$UME = 1 - M * \left(1 + \frac{q\_scale}{N}\right)^2 * \frac{\frac{q\_scale}{num\_bits}}{\max\left(\frac{q\_scale}{num\_bits}\right)}$$

wherein UME is the usefulness metric, q_scale is a quantization scale for a macroblock, num_bits is a number of bits to encode a luminance block, max is a function representing a maximum value for the frame, and M and N are scaling factors.

5. The method of claim 1, wherein the local spatial feature defined by the defining step is a variance of pixel luminance values over an n×n window covering n×n pixels, said variance defined according to the equation:

$$\mathrm{var}(i,j) = \sum_{k=-q}^{q}\sum_{m=-q}^{q} |pix(i+k, j+m) - \mathrm{mean}|$$

wherein q=(n−1)/2, pix(i+k, j+m) is a pixel value at location (i+k, j+m) and mean is an average pixel value over said n×n window.

6. The method of claim 1, wherein the frame type identified by the identifying step is an I-frame, and further wherein the step of calculating the coding gain includes the steps of:

calculating coding gain as:

$$UME = 1 - M*\left(1 + \frac{q\_scale}{N}\right)^2 * \frac{\frac{q\_scale}{num\_bits}}{\max\left(\frac{q\_scale}{num\_bits}\right)}$$

wherein UME is the usefulness metric, q_scale is a quantization scale for a macroblock, num_bits is a number of bits to encode a luminance block, max is a function representing a maximum value for the frame, and M and N are scaling factors, if the local spatial feature is greater than a predetermined variance threshold and if the number of bits to encode the luminance block is not zero; and calculating coding gain as zero if the local spatial feature is not greater than a predetermined variance threshold or if the number of bits to encode the luminance block is zero.

7. The method of claim 1, wherein the frame type identified by the identifying step is a P-frame or a B-frame having skipped and non-skipped blocks using a reference frame and further wherein the step of calculating the coding gain includes the steps of:

retrieving coding gain from the reference frame based on a motion vector for a skipped block;

calculating coding gain as zero for a non-skipped block if the local spatial feature is equal to or less than a predetermined variance threshold; and retrieving coding gain from the reference frame based on a motion vector for a non-skipped block if the local spatial feature is greater than a predetermined variance threshold.

8. The method of claim 1, wherein the frame type identified by the identifying step is a B-frame having a reference block with a coding gain map and further wherein the step of calculating the coding gain includes the step of:

copying the coding gain map of the reference frame as the coding gain for the B-frame.

9. The method of claim 1, wherein the applying step includes applying a peaking algorithm as the sharpness enhancement algorithm.

10. The method of claim 1, wherein the applying step includes applying a spatial-domain algorithm as the sharpness enhancement algorithm.

11. A system for enhancing sharpness of a coded digital video signal representative of at least one frame, said system comprising:

a selector to select and extract statistical information from a coded digital video signal;

a usefulness metric generator to create a usefulness metric for said coded digital video signal after decoding, said usefulness metric identifies a limit to sharpness enhancement to be applied to a decoded video signal;

means for defining local spatial features in the frame;

means for identifying a frame type for the frame;

means for calculating a coding gain of each pixel in the frame based on said local spatial features and said usefulness metric in accordance with the frame type; and a sharpness enhancer which applies a sharpness enhancement algorithm to the decoded digital video signal to improve sharpness of the signal based on said coding gain.

12. The system of claim 11, wherein said sharpness enhancement algorithm is a peaking algorithm.

13. The system of claim 11, wherein said sharpness enhancement algorithm is a spatial-domain algorithm.

14. The system of claim 11, wherein the sharpness enhancement algorithm applied is:

out_pixel=input_pixel+mpeg_gain*convolution_result, wherein output_pixel is a final luminance value to be used for the pixel, input_pixel is a luminance value of the input pixel, mpeg_gain is the coding gain, and convolution_result is a high-pass filter output.

15. The system of claim 11, wherein the usefulness metric created is:

$$UME = 1 - M*\left(1 + \frac{q\_scale}{N}\right)^2 * \frac{\frac{q\_scale}{num\_bits}}{\max\left(\frac{q\_scale}{num\_bits}\right)}$$

wherein UME is the usefulness metric, q_scale is a quantization scale for a macroblock, num_bits is a number of bits to encode a luminance block, max is a function representing a maximum value for the frame, and M and N are scaling factors.

16. The system of claim 11, wherein the local spatial feature is defined as a variance of pixel luminance values over an n×n window covering n×n pixels, said variance defined according to the equation:

$$\mathrm{var}(i,j) = \sum_{k=-q}^{q}\sum_{m=-q}^{q} |pix(i+k, j+m) - \mathrm{mean}|$$

wherein q=(n−1)/2, pix(i+k, j+m) is a pixel value at location (i+k, j+m) and mean is an average pixel value over said n×n window.

17. The system of claim 11, wherein when the frame type identified by the identifying means is an I-frame, the coding gain is calculated as:

$$UME = 1 - M*\left(1 + \frac{q\_scale}{N}\right)^2 * \frac{\frac{q\_scale}{num\_bits}}{\max\left(\frac{q\_scale}{num\_bits}\right)}$$

wherein UME is the usefulness metric, q_scale is a quantization scale for a macroblock, num_bits is a number of bits to encode a luminance block, max is a function representing a maximum value for the frame, and M and N are scaling factors, if the local spatial feature is greater than a predetermined variance threshold and if the number of bits to encode the luminance block is not zero; and coding gain is calculated as zero if the local spatial feature is not greater than a predetermined variance threshold or if the number of bits to encode the luminance block is zero.

18. The system of claim 11, wherein when the frame type identified by the identifying means is a P-frame or a B-frame having skipped and non-skipped blocks using a reference frame, the coding gain is calculated by:

retrieving coding gain from the reference frame based on a motion vector for a skipped block;

calculating coding gain as zero for a non-skipped block if local spatial feature is equal to or less than a predetermined variance threshold; and retrieving coding gain from the reference frame based on a motion vector for a non-skipped block if local spatial feature is greater than a predetermined variance threshold.

19. The system of claim 11, wherein when the frame type identified by the identifying means is a B-frame having a reference block with a coding gain map, the coding gain is calculated by copying the coding gain map of the reference frame as the coding gain for the B-frame.

* * * * *